(12) United States Patent
Shirai et al.

(10) Patent No.: US 6,553,283 B2
(45) Date of Patent: Apr. 22, 2003

(54) METHOD AND APPARATUS FOR RECOGNIZING SHAPE OF ROAD

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/793,498

(22) Filed: Feb. 27, 2001

(65) Prior Publication Data

US 2001/0025211 A1 Sep. 27, 2001

(30) Foreign Application Priority Data

Mar. 9, 2000 (JP) ........................................ 2000-065096

(51) Int. Cl.$^7$ .............................. G06F 7/00; G01S 3/02; B60Q 1/00; B62D 1/24
(52) U.S. Cl. ........................... 701/1; 342/454; 340/437; 180/169
(58) Field of Search .................... 701/1, 117, 23–28, 701/58–59, 65, 91–94, 96–99; 342/5, 42, 46–47, 52–54, 56, 70–71, 104–105, 107, 109, 113–114, 146, 149, 357.08, 371–372, 454–458, 461; 340/435–437; 180/167, 169

(56) References Cited

U.S. PATENT DOCUMENTS

| | | | | |
|---|---|---|---|---|
| 5,745,870 A | * | 4/1998 | Yamamoto et al. | 701/301 |
| 5,751,211 A | * | 5/1998 | Shirai et al. | 340/435 |
| 6,226,571 B1 | * | 5/2001 | Kai | 701/1 |
| 6,300,865 B1 | * | 10/2001 | Fechner et al. | 340/436 |

FOREIGN PATENT DOCUMENTS

| | | |
|---|---|---|
| JP | 5-159199 | 6/1993 |
| JP | 7-270536 | 10/1995 |
| JP | 8-249598 | 9/1996 |
| JP | 10-154300 | 6/1998 |
| JP | 10-239436 | 9/1998 |
| JP | 11-144198 | 5/1999 |
| JP | 11-352229 | 12/1999 |

* cited by examiner

Primary Examiner—Thu Nguyen
(74) Attorney, Agent, or Firm—Law Offices of David G. Posz

(57) ABSTRACT

A transmission wave is applied to a predetermined angular range in a width-wise direction of a vehicle. Object-unit data pieces containing at least data pieces representing distances to objects in correspondence with vehicle-width-wise direction angles are generated on the basis of a reflected wave. A determination is made as to whether each object is moving or stationary on the basis of a speed of the vehicle and a relative speed of the object. From the object-unit data pieces, ones are extracted which are effective for road shape recognition on the basis of a result of determining whether each object is moving or stationary. Ones of the extracted object-unit data pieces which represent monotonically increasing distances as viewed along one of clockwise and counterclockwise angle directions are grouped to generate data representing a road-side-object group. A road edge is recognized on the basis of the data representing the road-side-object group.

6 Claims, 7 Drawing Sheets

METHOD AND APPARATUS FOR RECOGNIZING SHAPE OF ROAD

BACKGROUND OF THE INVENTION

1. Field of the Invention

This invention relates to a method of recognizing the shape of a road which can be used by, for example, a system provided on a vehicle. In addition, this invention relates to an apparatus for recognizing the shape of a road which can be used by, for example, a system provided on a vehicle. Furthermore, this invention relates to a recording medium which stores a computer program for recognizing the shape of a road.

2. Description of the Related Art

A known obstacle detecting apparatus for a vehicle emits a forward wave beam such as a light beam or a millimeter wave beam from the body of the vehicle, and controls the forward wave beam to periodically scan a given angular region in front of the body of the vehicle. In the case where an obstacle exists in the given angular region, the forward wave beam encounters the obstacle before being at least partially reflected thereby. A portion of the reflected wave beam returns to the apparatus as an echo wave beam. The apparatus detects the obstacle in response to the echo wave beam.

The known obstacle detecting apparatus is used in a warning system for a vehicle which alarms when an obstacle such as a preceding vehicle exists in a given angular region in front of the present vehicle. The known obstacle detecting apparatus is used also in a system for a vehicle which controls the speed of the vehicle to maintain a proper distance between the vehicle and a preceding vehicle.

The known obstacle detecting apparatus additionally has the function of determining whether or not the detected obstacle is a preceding vehicle. In general, this determination is responsive to the output signals from a steering angle sensor and a yaw rate sensor. In the case where the present vehicle is traveling along a straight portion of a road while a preceding vehicle is traveling along a curved road portion extending ahead of the straight road portion, the known obstacle detecting apparatus has a chance of erroneously determining the preceding vehicle.

In view of such a problem in the known obstacle detecting apparatus, it is proposed to recognize the shape of a road from objects and delineators on the sides of the road.

Japanese patent application publication number 5-159199 discloses a warning system for a vehicle. The system in Japanese application 5-159199 emits a forward laser beam from the body of the vehicle, and controls the forward laser beam to periodically scan a given angular region in front of the body of the vehicle. In the case where an object exists in the given angular region, the forward laser beam encounters the object before being at least partially reflected thereby. A portion of the reflected laser beam returns to the system as an echo laser beam. The system detects the object in response to the echo laser beam. In addition, the system calculates the distance to the object from the time interval between the moment of emission of the forward laser beam and the moment of reception of the related echo laser beam. In the system of Japanese application 5-159199, a decision is made as to whether or not the distance to the object monotonically changes. When it is decided that the distance to the object monotonically changes, the object is judged to be a reflector on a curved road side. In this case, the system stops the generation of an alarm.

The system of Japanese application 5-159199 does not discriminate a reflector on a right-hand road side and a reflector on a left-hand road side from each other. Therefore, it is difficult for the system to distinctively recognize a right-hand road edge and a left-hand road edge.

Japanese patent application publication number 8-249598 discloses an apparatus for sensing delineators and recognizing a road shape from information about the sensed delineators. The apparatus in Japanese application 8-249598 emits a forward electromagnetic wave beam from the body of the vehicle, and controls the forward electromagnetic wave beam to periodically scan a given angular region in front of the body of the vehicle. In the case where an object exists in the given angular region, the forward electromagnetic wave beam encounters the object before being at least partially reflected thereby. A portion of the reflected electromagnetic wave beam returns to the apparatus as an echo electromagnetic wave beam. The apparatus detects the object in response to the echo electromagnetic wave beam. Specifically, the apparatus calculates the distance to the object from the time interval between the moment of emission of the forward electromagnetic wave beam and the moment of reception of the related echo electromagnetic wave beam. In addition, the apparatus calculates the direction of the object relative to the vehicle.

The apparatus in Japanese application 8-249598 decides whether each detected object is a delineator on a right-hand road side or a delineator on a left-hand road side in response to the horizontal variation in the position of the object relative to the vehicle. For example, decided delineators on a right-hand road side are linked by lines, and the set of the lines is recognized as a right-hand road edge. In the apparatus of Japanese application 8-249598, the decision as to whether each detected object is a right-hand delineator or a left-hand delineator is responsive to the horizontal variation in the relative position of the object. Therefore, it is difficult to implement the decision regarding an object detected for the first time. The result of the decision tends to be inaccurate when the horizontal variation in the relative position of an object is small or when the sign of the horizontal variation in the relative position of an object inverts.

Japanese patent application publication number 10-239436 discloses an apparatus for detecting the vehicle-to-vehicle distance. The apparatus in Japanese application 10-239436 emits a forward laser beam, and controls the forward laser beam to periodically scan a given angular region in front of the body of the present vehicle. The apparatus in Japanese application 10-239436 detects objects in the given angular range from return laser beams coming therefrom. Specifically, the apparatus detects the distances to the objects and the directions (the angular positions) of the objects relative to the present vehicle. The detected objects include reflectors on the right-hand and left-hand sides of the road. In the apparatus of Japanese application 10-239436, the shape of the road is recognized from the loci (trajectories) of detected reflectors on the road sides.

Japanese patent application publication number 7-270536 discloses an object determination apparatus for a vehicle. The apparatus in Japanese application 7-270536 emits a forward laser beam, and controls the forward laser beam to periodically scan a given angular region in front of the body of the present vehicle. The apparatus in Japanese application 7-270536 detects objects in the given angular range from return laser beams coming therefrom. Specifically, the apparatus detects the distances to the objects and the directions (the angular positions) of the objects relative to the present vehicle. The detected objects are sorted with respect to distance. Each continuity between two adjacent objects among the detected objects is judged, and the detected objects are separated into groups in response to the judgement results. According to the total number of the objects in each group and the relation among the relative positions thereof, it is decided whether they are discrete objects or continuous objects. The continuous objects are recognized as road facilities, while the discrete objects are recognized as preceding vehicles.

SUMMARY OF THE INVENTION

It is a first object of this invention to provide a method of accurately recognizing the shape of a road even when the time-domain variation in the relative position of a road-side object is unknown.

It is a second object of this invention to provide an apparatus for accurately recognizing the shape of a road even when the time-domain variation in the relative position of a road-side object is unknown.

It is a third object of this invention to provide a recording medium which stores a computer program for accurately recognizing the shape of a road even when the time-domain variation in the relative position of a road-side object is unknown.

A first aspect of this invention provides a method of applying a transmission wave to a predetermined angular range in a width-wise direction of a vehicle, and recognizing a shape of a road extending ahead of the vehicle on the basis of a reflected wave which results from reflection of the transmission wave. The method comprises the steps of generating object-unit data pieces containing at least data pieces representing distances to objects in correspondence with vehicle-width-wise direction angles on the basis of the reflected wave; determining whether each object is moving or stationary on the basis of a speed of the vehicle and a relative speed of the object which is derived from the reflected wave; extracting ones from the object-unit data pieces which are effective for road shape recognition on the basis of a result of determining whether each object is moving or stationary, and grouping ones of the extracted object-unit data pieces which represent monotonically increasing distances as viewed along one of clockwise and counterclockwise angle directions to generate data representing a road-side-object group; and recognizing a road edge on the basis of the data representing the road-side-object group.

A second aspect of this invention provides an apparatus for recognizing a road shape. The apparatus comprises radar means for applying a transmission wave to a predetermined angular range in a width-wise direction of a vehicle, and detecting each object on the basis of a reflected wave which results from reflection of the transmission wave; and recognizing means for recognizing a shape of a road extending ahead of the vehicle on the basis of a result of detection by the radar means. The recognizing means comprises 1) object-unit data generating means for generating object-unit data pieces containing at least data pieces representing distances to objects in correspondence with vehicle-width-wise direction angles on the basis of the result of the detection by the radar means; 2) object recognizing means for determining whether each object is moving or stationary on the basis of a speed of the vehicle and a relative speed of the object which is derived from the reflected wave; 3) effective data extracting means for extracting ones from the object-unit data pieces which are effective for road shape recognition on the basis of a result of the determination by the object recognizing means; 4) road-side-object group data generating means for grouping ones of the extracted effective object-unit data pieces which represent monotonically increasing distances as viewed along one of clockwise and counterclockwise angle directions to generate data representative of a road-side-object group; and 5) road edge recognizing means for recognizing a road edge on the basis of the data representative of the road-side-object group which are generated by the road-side-object group data generating means.

A third aspect of this invention is based on the second aspect thereof, and provides an apparatus wherein the road-side-object group data generating means comprising means for grouping ones of the extracted effective object-unit data pieces which represent monotonically increasing distances as viewed along the clockwise angle direction to generate data representative of a first road-side-object group, and means for grouping ones of the extracted effective object-unit data pieces which represent monotonically increasing distances as viewed along the counterclockwise angle direction to generate data representative of a second road-side-object group, and wherein the road edge recognizing means comprises means for recognizing a first road edge on the basis of the data representative of the first road-side-object group, and means for recognizing a second road edge on the basis of the data representative of the second road-side-object group.

A fourth aspect of this invention is based on the second aspect thereof, and provides an apparatus wherein the road-side-object group data generating means comprises means for grouping ones of the extracted effective object-unit data pieces which represent monotonically increasing distances as viewed along one of clockwise and counterclockwise angle directions, and which relate to conditions where a distance between neighboring objects is equal to or less than an adjacent-state-corresponding value to generate data representative of a road-side-object group.

A fifth aspect of this invention is based on the second aspect thereof, and provides an apparatus wherein the road edge recognizing means comprises means for recognizing a road edge on the basis of the data representative of the road-side-object group which has at least three object-unit data pieces.

A sixth aspect of this invention is based on the fifth aspect thereof, and provides an apparatus wherein the road edge recognizing means comprises means for forming lines connecting objects indicated by the object-unit data pieces in the road-side-object group through interpolation, and means for recognizing the road edge on the basis of the formed lines.

A seventh aspect of this invention is based on the sixth aspect thereof, and provides an apparatus wherein the road edge recognizing means comprises means for calculating a point of intersection between an extension of a set of the formed lines and an width-wise-direction axis of the vehicle, means for connecting the point of intersection and a nearest object by an additional line through interpolation, and means for recognizing a road edge extending from a place near the vehicle on the basis of the additional line and the set of the formed lines.

An eighth aspect of this invention is based on the second aspect thereof, and provides an apparatus wherein the object-unit data generating means comprises means for unifying ones of point-unit data pieces into segment data pieces, the point-unit data pieces representing distances and angles corresponding to point units for objects, the unified ones corresponding to point units close to each other in position and distance, and means for setting the segment data pieces as the object-unit data pieces.

A ninth aspect of this invention is based on the second aspect thereof, and provides an apparatus wherein the effective data extracting means comprises means for, to extract the effective object-unit data pieces, discarding ones among the object-unit data pieces which satisfy conditions as follows:
1) a shape of a related object is outside a predetermined range; and
2) a related object is located near a moving object.

A tenth aspect of this invention is based on the second aspect thereof, and provides an apparatus wherein the road-side-object group data generating means comprises means for determining whether or not a farthest object in the road-side-object group is on a road side same as a road side for other objects in the road-side-object group on the basis of a positional relation among the farthest object and the other objects, and means for keeping the farthest object in the road-side-object group only when the farthest object is on the same road side.

An eleventh aspect of this invention is based on the third aspect thereof, and provides an apparatus wherein the road-side-object group data generating means comprises means for determining whether or not a farthest object in the first road-side-object group and a farthest object in the second road-side-object group are a same, means for, when the farthest objects are the same, removing the farthest object from the first and second road-side-object groups and changing the first and second road-side-object groups into third and fourth road-side-object groups respectively, and means for generating data representative of the third road-side-object group and data representative of the fourth road-side-object group, and wherein the road edge recognizing means comprises means for recognizing the first road edge on the basis of the data representative of the third road-side-object group, and means for recognizing the second road edge on the basis of the data representative of the fourth road-side-object group.

A twelfth aspect of this invention is based on the third aspect thereof, and provides an apparatus wherein the road-side-object group data generating means comprises means for determining whether or not a farthest object in the first road-side-object group and a farthest object in the second road-side-object group are a same, means for, when the farthest objects are the same, determining which of the first and second road-side-object groups actually contains the farthest object at a higher possibility on the basis of positional relations among the farthest object and other objects in the first and second road-side-object group, means for keeping the farthest object in one of the first and second road-side-object groups which corresponds to the higher possibility and removing the farthest object from the other of the first and second road-side-object groups to generate third and fourth road-side-object groups from the first and second road-side-object groups respectively, and means for generating data representative of the third road-side-object group and data representative of the fourth road-side-object group, and wherein the road edge recognizing means comprises means for recognizing the first road edge on the basis of the data representative of the third road-side-object group, and means for recognizing the second road edge on the basis of the data representative of the fourth road-side-object group.

A thirteenth aspect of this invention is based on the second aspect thereof, and provides an apparatus wherein the road-side-object group data generating means comprises means for unconditionally removing a farthest object from the road-side-object group, and using a resultant road-side-object group as a final road-side-object group.

A fourteenth aspect of this invention provides a recording medium storing a program for controlling a computer operating as the recognizing means in the apparatus of the second aspect of this invention.

A fifteenth aspect of this invention provides an apparatus for a vehicle. The apparatus comprises first means for detecting stationary objects in an area extending ahead of the vehicle; second means for calculating angular positions of the stationary objects detected by the first means relative to the vehicle; third means for calculating distances to the stationary objects detected by the first means relative to the vehicle; fourth means for calculating distances between neighboring ones of the stationary objects detected by the first means; fifth means for sequentially arranging the stationary objects detected by the first means in an order of angular position; sixth means for selecting ones from among the stationary objects arranged by the fifth means, wherein the selected objects satisfy conditions that a distance to each selected object increases as the selected object changes from one to a next in the order of angular position, and that distances between neighboring ones of the selected objects are equal to or less than a predetermined reference value; seventh means for grouping the stationary objects selected by the sixth means into a group; and eighth means for recognizing a road edge in response to the group generated by the seventh means.

DETAILED DESCRIPTION OF THE INVENTION

Figure 1:
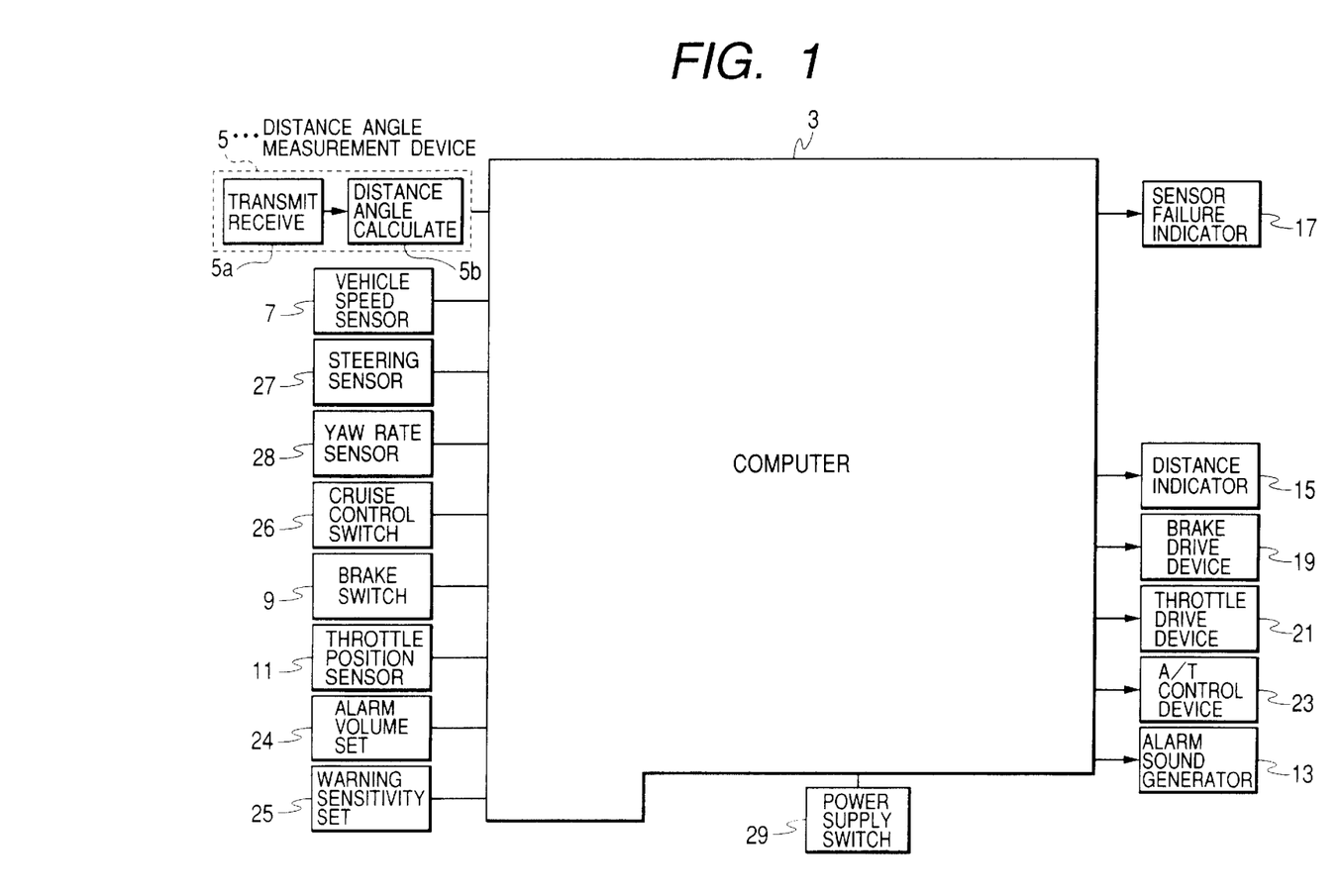
FIG. 1 is a block diagram of a vehicle control apparatus according to an embodiment of this invention.

FIG. 1 shows a vehicle control apparatus according to an embodiment of this invention. The vehicle control apparatus is mounted on a vehicle. The vehicle control apparatus alarms when an obstacle in a specified condition exists in a given angular region (a given detection area) in front of the present vehicle. The vehicle control apparatus adjusts the speed of the present vehicle in accordance with the speed of a preceding vehicle.

As shown in FIG. 1, the vehicle control apparatus includes a computer (for example, a microcomputer) 3. The computer 3 has a combination of an input/output (I/O) interface, a CPU, a ROM, and a RAM. The computer 3 operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, or a hard disk. In this case, the computer 3 is connected with a drive for the recording medium, and the program is downloaded into the computer 3 through the drive.

The vehicle control apparatus includes a distance and angle measurement device 5, a vehicle speed sensor 7, a brake switch 9, and a throttle opening degree sensor (a throttle position sensor) 11 which are connected to the computer 3. The output signals of the devices 5, 7, 9, and 11 are inputted into the computer 3. The distance and angle measurement device 5 acts as an obstacle detection device for the present vehicle.

The vehicle control apparatus includes an alarm sound generator 13, a distance indicator 15, a sensor failure indicator 17, a brake drive device 19, a throttle drive device 21, and an automotive automatic transmission control device 23 which are connected to the computer 3. The computer 3 outputs drive signals to the devices 13, 15, 17, 19, 21, and 23.

The vehicle control apparatus includes an alarm sound volume setting device 24, an alarm sensitivity setting device 25, a cruise control switch 26, a steering sensor 27, and a yaw rate sensor 28 which are connected to the computer 3. The output signals of the devices 24, 25, 26, 27, and 28 are inputted into the computer 3. The alarm sound volume setting device 24 acts to set the volume of alarm sound. The alarm sensitivity setting device 25 acts to set the sensitivity in a warning determination process mentioned later. The steering sensor 27 detects the degree of operation of a vehicle steering wheel (not shown), that is, the steering angle in the present vehicle.

The vehicle control apparatus includes a power supply switch 29 connected to the computer 3. When the power supply switch 29 is changed to its on position, the computer 3 is powered and starts predetermined processes.

The distance and angle measurement device 5 has a transmitting and receiving portion 5a, and a distance and angle calculating portion 5b. The transmitting and receiving portion 5a emits a forward laser beam ahead of the present vehicle, and controls the forward laser beam to periodically scan a given angular region in front of the present vehicle. The given angular region corresponds to a given sectorial detection area monitored by the transmitting and receiving portion 5a. In the case where an object exists in the detection area (the given angular region), the forward laser beam encounters the object before being at least partially reflected thereby. A portion of the reflected laser beam returns to the transmitting and receiving portion 5a as an echo laser beam. The transmitting and receiving portion 5a receives the echo laser beam, and converts the echo laser beam into a corresponding electric signal. The transmitting and receiving portion 5a outputs the electric signal to the distance and angle calculating portion 5b. The distance and angle calculating portion 5b detects the angle (the angular position) "θ" of the object in response to the output signal from the transmitting and receiving portion 5a. The distance and angle calculating portion 5b measures the time interval between the moment of the transmission of a forward laser beam and the moment of the reception of a related echo laser beam in response to the output signal from the transmitting and receiving portion 5a. The distance and angle calculating portion 5b detects the distance "r" to the object from the present vehicle on the basis of the measured time interval. The distance and angle calculating portion 5b informs the computer 3 of the angle (the angular position) "θ" of the object and the distance "r" thereto. In general, since the object is smaller than the cross-sectional area of the forward laser beam and is scanned thereby, the distance and angle information notified from the distance and angle calculating portion 5b to the computer 3 relates to a partial object or a point-like part of an object. Objects detected by the distance and angle measurement device 5 include obstacles with respect to the present vehicle.

The laser beam may be replaced by a radio wave beam, a millimeter wave beam, or an ultrasonic beam. The scanning may be implemented by controlling the echo beam reception by the transmitting and receiving portion 5a.

The computer 3 executes a warning determination process designed to generate an alarm in the case where an obstacle remains in a specified area during longer than a prescribed time interval. The obstacle corresponds to, for example, a preceding vehicle, a stationary vehicle, a guardrail on a road side, or a prop on a road side. Simultaneously with the execution of the warning determination process, the computer 3 operates to control the distance between the present vehicle and a preceding vehicle. Specifically, during the inter-vehicle distance control (the vehicle-to-vehicle distance control), the computer 3 controls the brake drive device 19, the throttle drive device 21, and the automatic transmission control device 23 and thereby adjusts the speed of the present vehicle in accordance with conditions of the preceding vehicle.

Figure 2:
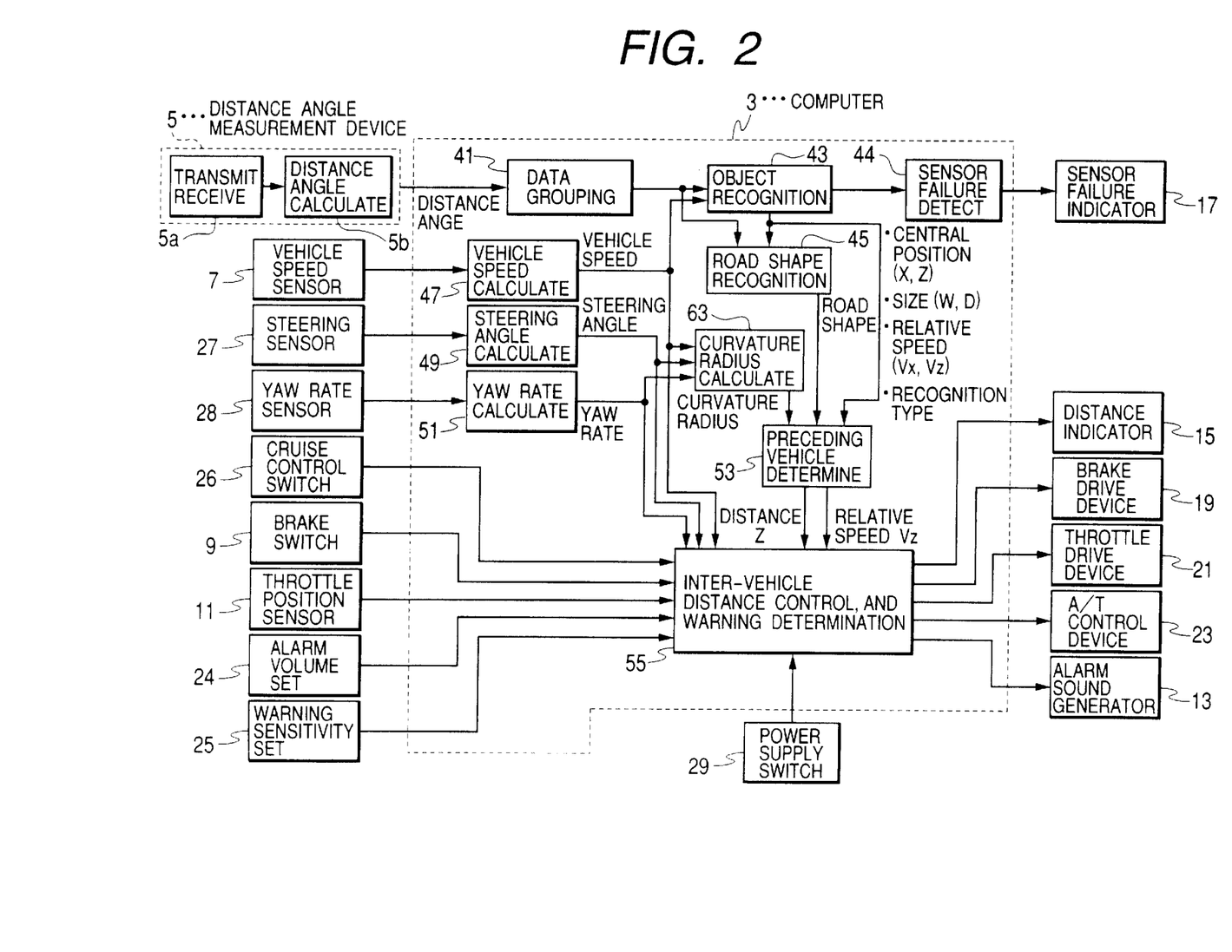
FIG. 2 is an operation flow diagram of a computer in FIG. 1.

FIG. 2 shows the flow of operation of the computer 3 rather than the hardware structure thereof. With reference to FIG. 2, a data grouping block 41 receives, from the distance and angle calculating portion 5b in the distance and angle measurement device 5, measurement data representing a distance "r" and an angle "θ" concerning each detected object (each detected partial object or each detected point-like object part). The data grouping block 41 converts the distance and angle data of polar coordinates into measurement data of X-Z orthogonal coordinates designed so that the origin (0, 0) coincides with the center of a laser radar formed by the distance and angle measurement device 5, and the X axis and the Z axis coincide with a width-wise direction and a longitudinal forward direction of the present vehicle respectively. The data grouping block 41 groups detected partial objects (detected point-like object parts) represented by the orthogonal-coordinate measurement data into sets or segments corresponding to detected complete objects respectively. The grouping and the segments will be described later. Pieces of the grouping-resultant segment data which indicate respective segments are object-unit data pieces (per-object data pieces). The data block 41 outputs the grouping-resultant segment data, that is, the object-unit data, to an object recognition block 43 and a road shape recognition block 45.

A vehicle speed calculation block 47 computes the speed V of the present vehicle on the basis of the output signal from the vehicle speed sensor 7.

The object recognition block 43 calculates the central position (X, Z) and size (W, D) of each detected complete object on the basis of the grouping-resultant segment data. Here, W denotes a transverse width, and D denotes a depth. The object recognition block 43 calculates the speed (Vx, Vz) of the complete object relative to the present vehicle from a time-domain variation in the central position (X, Z) thereof. The object recognition block 43 is informed of the speed V of the present vehicle by the vehicle speed calculation block 47. The object recognition block 43 determines whether or not each detected complete object is stationary or moving on the basis of the vehicle speed V and the relative speed (Vx, Vz). One or more which may affect the travel of the present vehicle are selected from among detected complete objects on the basis of the stationary-moving determination results and the central positions of the detected complete objects. Information of the distance to each selected complete object is transferred to the distance indicator 15 so that the distance to the selected complete object is indicated by the distance indicator 15.

A sensor failure detection block 44 receives the output data (the object-recognition result data) from the object recognition block 43 which represent the object parameters calculated thereby. The sensor failure detection block 44 determines whether the output data from the object recognition block 43 are in a normal range or an abnormal range. When the output data from the object recognition block 43 are in the abnormal range, the sensor failure detection block 44 activates the sensor failure indicator 17 to indicate a failure.

The road shape recognition block 45 receives the object-recognition result data from the object recognition block 43. The road shape recognition block 45 recognizes a road shape on the basis of the grouping-resultant segment data and the object-recognition result data. The recognition of a road shape will be described later in more detail. The road shape recognition block 45 outputs data (road shape data) to a preceding-vehicle determination block 53 which represent the result of the road shape recognition.

A steering angle calculation block 49 computes the steering angle regarding the present vehicle on the basis of the output signal from the steering sensor 27. A yaw rate calculation block 51 computes the yaw rate of the present vehicle on the basis of the output signal from the yaw rate sensor 28.

A curvature-radius calculation block 63 is informed of the vehicle speed V by the vehicle speed calculation block 47. The curvature-radius calculation block 63 is informed of the computed steering angle by the steering angle calculation block 49. The curvature-radius calculation block 63 is informed of the computed yaw rate by the yaw rate calculation block 51. The curvature-radius calculation block 63 computes the radius R of curvature of the road on the basis of the vehicle speed V, the steering angle, and the yaw rate.

The preceding-vehicle determination block 53 is informed of the computed curvature radius R by the curvature-radius calculation block 63. The preceding-vehicle determination block 53 is informed of the stationary-moving determination results, the object central positions (X, Z), the object sizes (W, D), and the relative speeds (Vx, Vz) by the object recognition block 43. The preceding-vehicle determination block 53 receives the road shape data from the road shape recognition block 45. The preceding-vehicle determination block 53 determines or selects a preceding vehicle from among the detected complete objects on the basis of the curvature radius R, the stationary-moving determination results, the object central positions (X, Z), the object sizes (W, D), the relative speeds (Vx, Vz), and the road shape data. The preceding-vehicle determination block 53 calculates the distance Z to the preceding vehicle from the present vehicle, and the speed Vz of the preceding vehicle relative to the present vehicle.

An inter-vehicle distance control and warning determination block (a vehicle-to-vehicle distance control and warning determination block) 55 is informed of the distance Z to the preceding vehicle and the relative speed Vz by the preceding-vehicle determination block 53. The inter-vehicle distance control and warning determination block 55 is informed of the vehicle speed V by the vehicle speed calculation block 47. The inter-vehicle distance control and warning determination block 55 computes the acceleration of the preceding vehicle from the relative speed Vz and the vehicle speed V. The inter-vehicle distance control and warning determination block 55 is informed of the object central positions (X, Z), the object widths D, and the stationary-moving determination results by the object recognition block 43. The inter-vehicle distance control and warning determination block 55 detects setting conditions of the cruise control switch 26 from the output signal thereof. The inter-vehicle distance control and warning determination block 55 detects the state of the brake switch 9 from the output signal thereof. The state of the brake switch 9 represents whether or not a vehicle brake pedal is depressed. The inter-vehicle distance control and warning determination block 55 is informed of the degree of opening through a vehicular engine throttle valve by the throttle opening degree sensor 11. The inter-vehicle distance control and warning determination block 55 is informed of the alarm sensitivity setting value by the alarm sensitivity setting device 25. The inter-vehicle distance control and warning determination block 55 implements a warning determination and a cruise determination in response to the distance Z to the preceding vehicle, the relative speed Vz, the vehicle speed V, the preceding-vehicle acceleration, the object central positions (X, Z), the object widths D, the stationary-moving determination results, the setting conditions of the cruise control switch 26, the state of the brake switch 9, the throttle opening degree, and the alarm sensitivity setting value. During the warning determination, the inter-vehicle distance control and warning determination block 55 determines whether or not an alarm should be generated. During the cruise determination, the inter-vehicle distance control and warning determination block 55 determines the contents of vehicle speed control. When it is determined that an alarm should be generated, the inter-vehicle distance control and warning determination block 55 outputs an alarm generation signal to the alarm sound generator 13. In this case, the alarm sound generator 13 produces alarm sound. The inter-vehicle distance control and warning determination block 55 adjusts the level of the alarm sound in accordance with the sound volume set by the alarm sound volume setting device 24. In the case where the cruise determination corresponds to the execution of cruise control, the inter-vehicle distance control and warning determination block 55 outputs suitable control signals to the automotive automatic transmission control device 23, the brake drive device 19, and the throttle drive device 21. During the execution of the warning control and the cruise control, the inter-vehicle distance control and warning determination block 55 outputs an indication signal to the distance indicator 15 to inform the vehicle's driver of distance-related conditions.

Figure 3:
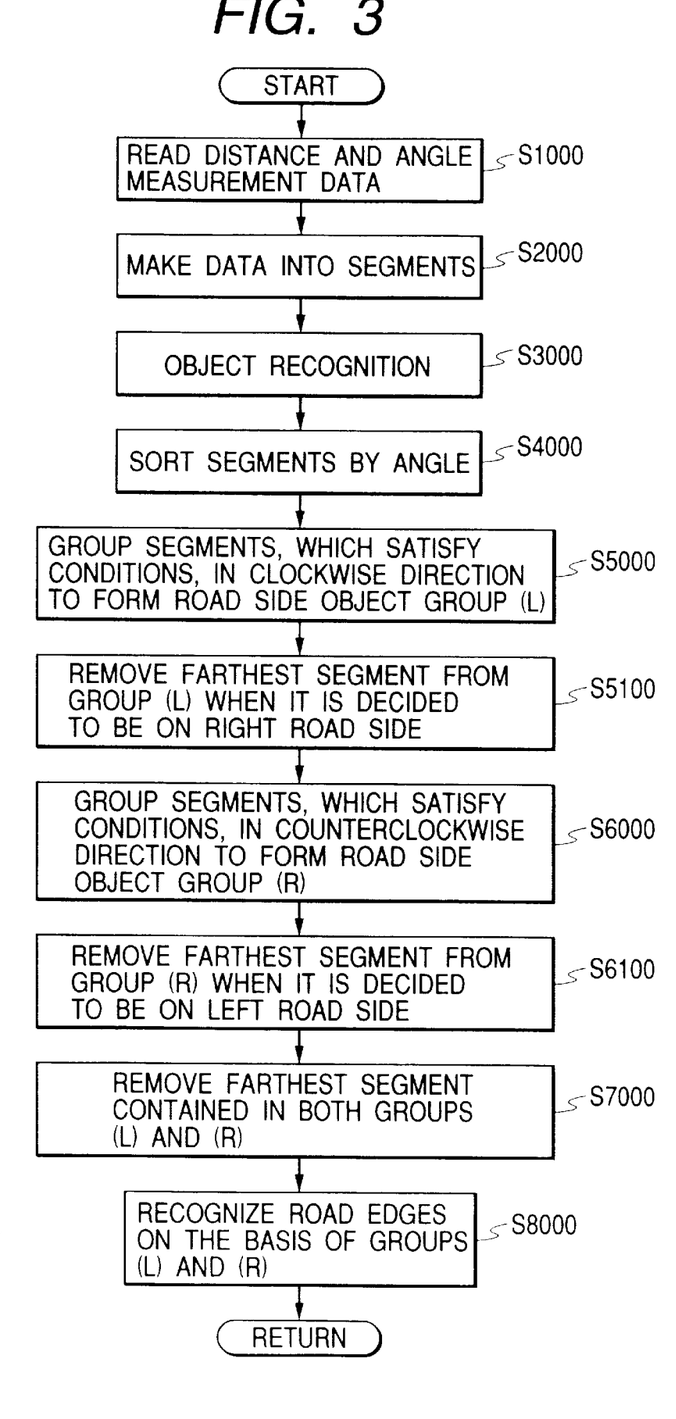
FIG. 3 is a flowchart of a portion of a program for the computer in FIG. 1.

As previously mentioned, the computer 3 operates in accordance with a program stored in its internal ROM or RAM. FIG. 3 is a flowchart of a portion of the program for the computer 3 which relates to the recognition of a road shape. The program portion in FIG. 3 is repetitively executed at a period corresponding to the period of the scanning implemented by the distance and angle measurement device 5.

As shown in FIG. 3, a first step S1000 of the program portion receives distance and angle measurement data from the distance and angle measurement device 5 for one period of the scanning. In other words, the step S1000 receives distance and angle measurement data corresponding to one frame. The scanning period is equal to, for example, 100 msec.

A step S2000 following the step S1000 corresponds to the data grouping block 41. The step S2000 converts the distance and angle data of polar coordinates into measurement data of X-Z orthogonal coordinates. The orthogonal-coordinate measurement data represent detected partial objects or detected point-like object parts. The step S2000 groups the detected point-like object parts (the detected partial objects) into segments corresponding to detected complete objects respectively.

Figure 4:
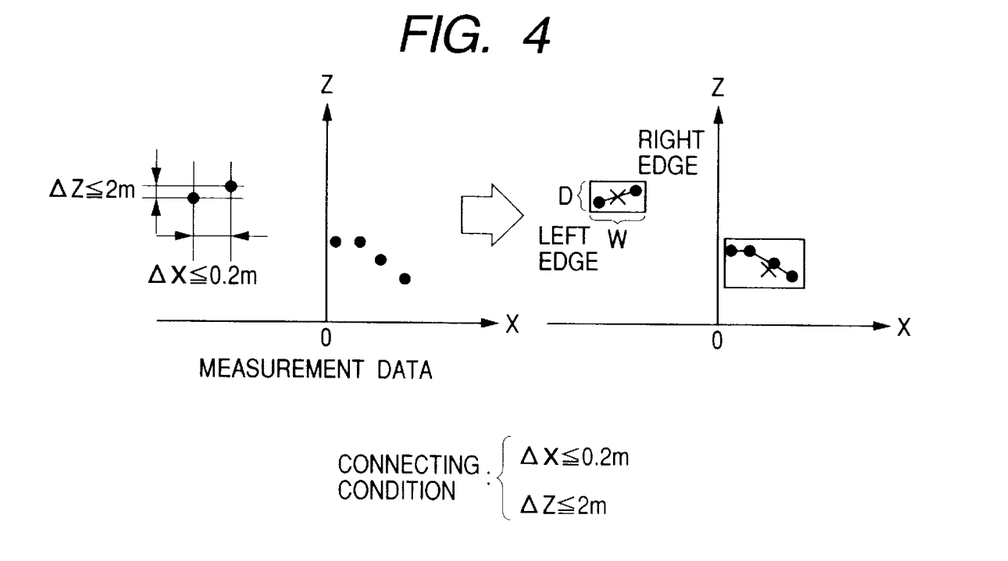
FIG. 4 is a diagram of an example of detected point-like object parts, and segments which result from unifying close ones of the detected point-like object parts.

With reference to FIG. 4, the step S2000 searches the detected point-like object parts for close ones which are spaced by X-axis-direction distances ΔX of 0.2 m or less and Z-axis-direction distances ΔZ of 2 m or less. The step S2000 combines or unifies the close point-like object parts into a segment (a set) corresponding to a detected complete object. There can be a plurality of segments. The step S2000 generates data representing segments which are referred to as segment data. Specifically, one segment data piece (one data piece representing a segment) generated by the step S2000 corresponds to a rectangular region having two sides parallel to the X axis and two sides parallel to the Z axis. One segment data piece contains an information piece indicating the central position of the related segment, an information piece indicating the size (W, D) of the segment, an information piece indicating the coordinates of the right-hand edge of the segment, and the coordinates of the left-hand edge of the segment.

With reference back to FIG. 3, a step S3000 subsequent to the step S2000 corresponds to the object recognition block 43 (see FIG. 2), and implements the previously-mentioned object recognition on the basis of the segment data generated by the step S2000.

The step S3000 is followed by a sequence of steps S4000–S8000 which correspond to the road shape recognition block 45 in FIG. 2.

The step S4000 following the step S3000 handles the X-Z coordinate positions of the centers of the segments which are generated by the step S2000. The step S4000 transforms the X-Z coordinate central positions of the segments into the polar-coordinate central positions thereof. The polar-coordinate central position of each segment is a set of the distance to the segment and the angle (the angular position) of the segment. The step S4000 sorts the segments by angle (angular position). In other words, the step S4000 sequentially arranges the segments in the order of angle (angular position).

The step S5000 subsequent to the step S4000 examines the segments which have been sorted by the step S4000. Specifically, the step S5000 sequentially examines the segments in the clockwise direction starting from the left-hand edge of the detection area, and finds ones among the segments which satisfy predetermined conditions. The step S5000 collects the found segments into a road-side-object group or groups (L), where (L) denotes "left-hand".

Figure 5:
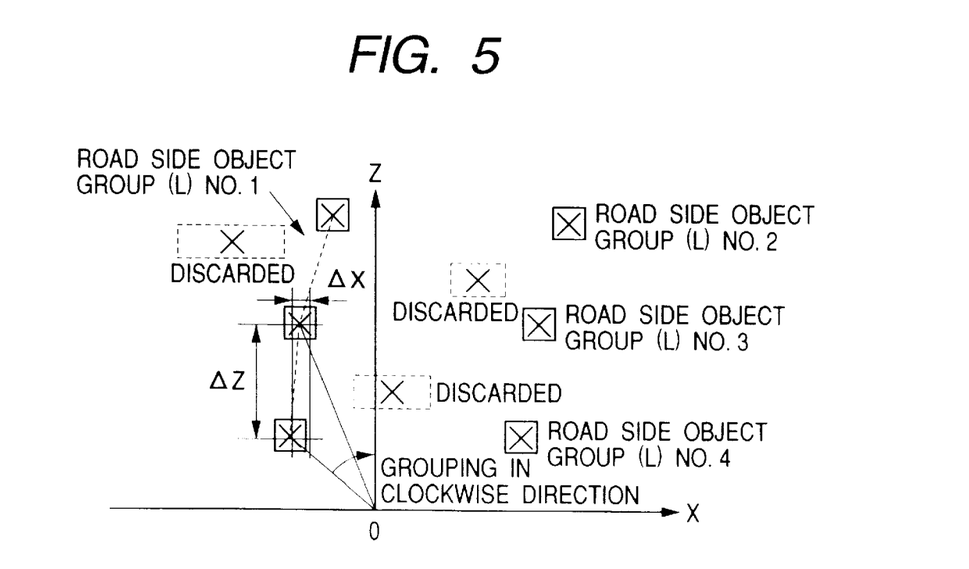
FIG. 5 is a diagram of an example of segments, and road-side-object groups which result from discarding improper ones of the segments and grouping effective ones of the segments.

Specifically, as shown in FIG. 5, the step S5000 discards ones of the segments which differ from delineators on the road sides. For example, the step S5000 discards ones of the segments which correspond to signboards and vehicles. Preferably, the step S5000 discards ones of the segments which correspond to objects determined to be moving by the step S3000. Thus, the step S5000 selects ones from among the segments which correspond to delineators. In more detail, the step S5000 discards each segment corresponding to an object determined to be moving by the step S3000. Furthermore, the step S5000 discards each segment which satisfies at least one of conditions ① and ② as follows.

① The transverse width W of a segment is equal to or greater than 1.2 m, and the aspect ratio D/W (the depth-to-width ratio) of the segment is smaller than 5.

② A segment exists near an object decided to be moving by the step S3000. Specifically, the X-axis-direction distance ΔX between the centers of the segment and the moving object is equal to or less than 2 m, and the Z-axis-direction distance ΔZ therebetween is equal to or less than 2 m.

Then, the step S5000 sequentially examines the remaining segments, that is, the segments except discarded ones, in the clockwise direction starting from the left-hand edge of the detection area, and finds neighboring or successive ones among the remaining segments which satisfy both conditions ③ and ④ as follows.

③ The distance Z to a segment increases as the segment changes from one to the next in the clockwise direction.

④ The X-axis-direction distance ΔX between the centers of a segment and the next is equal to or less than 3.5 m, and the Z-axis-direction distance ΔZ therebetween is equal to or less than 55 m.

As shown in FIG. 5, the step S5000 collects the found segments into a road-side-object group or groups (L), and assign serial numbers thereto. For example, the step S5000 connects two or more neighboring found segments (two or more successive found segments) by lines to form a road-side-object group (L) having the connected segments. The step S5000 can form a plurality of road-side-object groups (L). The previously-indicated condition ③ causes each road-side object group (L) to have the feature that the distance Z monotonically increases as the segment changes from one to the next in the clockwise direction. At least one of the previously-indicated conditions ③ and ④ is not satisfied between a segment in a group and a segment in another group. Each road-side-object group (L) can have only one segment. The step S5000 selects one or ones each having at least three segments from among the road-side-object groups (L). Preferably, the step S5000 selects only one having at least three segments from among the road-side-object groups (L). The road-side-object group (L) selected by the step S5000 will be used in road edge recognition.

With reference to FIG. 5, there are four road-side-object groups (L) sequentially assigned No. 1, No. 2, No. 3, and No. 4. The road-side-object group (L) No. 1 has three segments. Each of the road-side-object groups (L) No. 2, No. 3, and No. 4 has only one segment. Accordingly, the road-side-object group (L) No. 1 is selected by the step S5000.

The step S5100 following the step S5000 examines the segment having the greatest distance Z, that is, the farthest segment, among the segments in the road-side-object group (L) selected by the step S5000. Specifically, the step S5100 determines whether the farthest segment is on the right-hand road side or the left-hand road side. When the farthest segment is on the right-hand road side, the step S5100 removes the farthest segment from the selected road-side-object group (L). On the other hand, when the farthest segment is on the left-hand road side, the step S5100 keeps the farthest segment in the selected road-side-object group (L).

Figure 6:
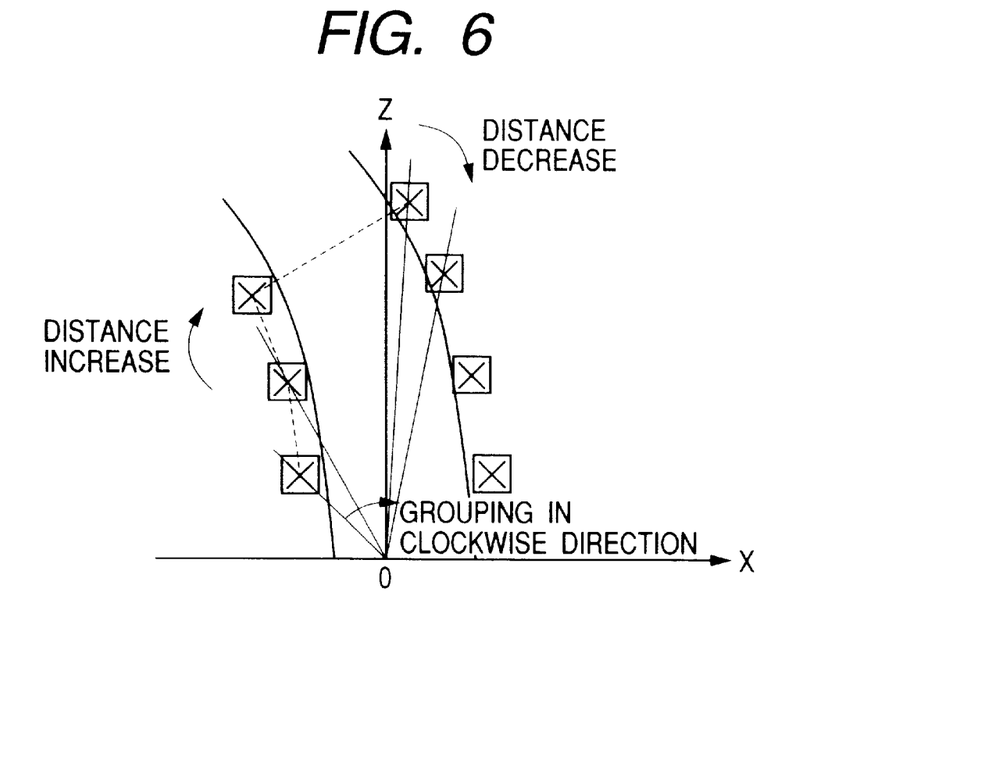
FIG. 6 is a diagram of an example of road-side-object groups containing a group in which the farthest segment is wrong.

With reference to FIG. 6, there is a selected road-side-object group (L) having four segments. The farthest segment in the selected road-side-object group (L) is on the right-hand road side, while the other segments therein are on the left-hand road side. Actually, there is a chance that the farthest segment in a selected road-side-object group (L) is on the right-hand road side. On the other hand, there is hardly a chance that both the farthest and second farthest segments in a selected road-side-object group (L) are on the right-hand road side. Therefore, in this regard, it is sufficient to examine only the farthest segment in a selected road-side-object group (L).

Figure 7:
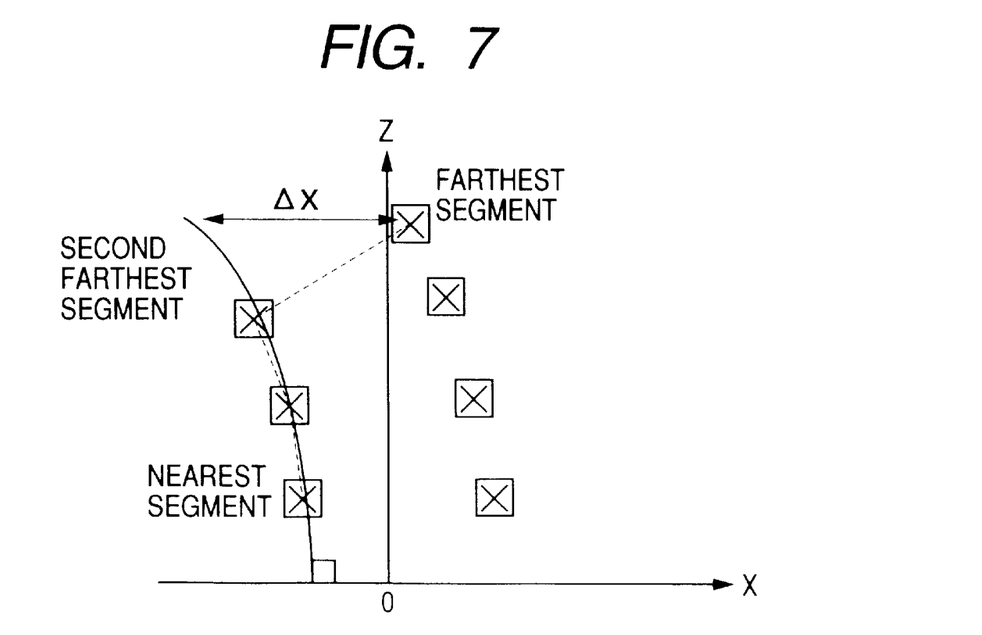
FIG. 7 is a diagram of an example of road-side-object groups containing a group in which the farthest segment is wrong.

In more detail, as shown in FIG. 7, the step S5100 connects the segments except the farthest segment in the selected road-side-object group (L) by a smooth curve. The step S5100 decides whether or not the farthest segment exists near the smooth curve. When the farthest segment exists near the smooth curve, the step S5100 determines that the farthest segment is on the left-hand road side. Otherwise, the step S5100 determines that the farthest segment is on the right-hand road side.

Specifically, the step S5100 calculates a circle which passes through the nearest and second farthest segments in the selected road-side-object group (L), and which intersects with the X axis at a right angle. The step S5100 uses the circle as the above-indicated smooth curve. The step S5100 calculates the X-axis-direction distance ΔX between the circle and the farthest segment. Then, the step S5100 decides whether or not the calculated X-axis-direction distance ΔX is smaller than 1.5 m. When the calculated X-axis-direction distance ΔX is smaller than 1.5 m, the step S5100 determines that the farthest segment is on the left-hand road side. In this case, the step S5100 keeps the farthest segment in the selected road-side-object group (L). On the other hand, when the calculated X-axis-direction distance ΔX is equal to or greater than 1.5 m, the step S5100 determines that the farthest segment is on the right-hand road side. In this case, the step S5100 removes the farthest segment from the selected road-side-object group (L). The step S5100 may examine the farthest segment on the basis of the nearest distance between the farthest segment and the circle, that is, the length of the straight line connecting the circle and the farthest segment and meeting the circle at a right angle.

The step S6000 subsequent to the step S5100 is similar in contents to the step S5000 except that the step S6000 generates a road-side-object group (R) rather than a road-side-object group (L), where (R) denotes "right-hand". Specifically, the step S6000 sequentially examines the segments in the counterclockwise direction starting from the right-hand edge of the detection area, and finds ones among the segments which satisfy the previously-mentioned conditions. At this time, the step S6000 discards ones of the segments which differ from delineators on the road sides. Then, the step S6000 sequentially examines the remaining segments, that is, the segments except discarded ones, in the counterclockwise direction, and finds neighboring or successive ones among the remaining segments which satisfy the previously-mentioned conditions. The step S6000 collects the found segments into a road-side-object group or groups (R). The step S6000 selects one having at least three segments from among the road-side-object groups (R).

The step S6100 following the step S6000 is similar in contents to the step S5100 except that the step 6100 examines the farthest segment in the road-side-object group (R) selected by the step S6000. Specifically, the step S6100 determines whether the farthest segment is on the right-hand road side or the left-hand road side. When the farthest segment is on the left-hand road side, the step S6100 removes the farthest segment from the selected road-side-object group (R). On the other hand, when the farthest segment is on the right-hand road side, the step S6100 keeps the farthest segment in the selected road-side-object group (R).

Figure 8:
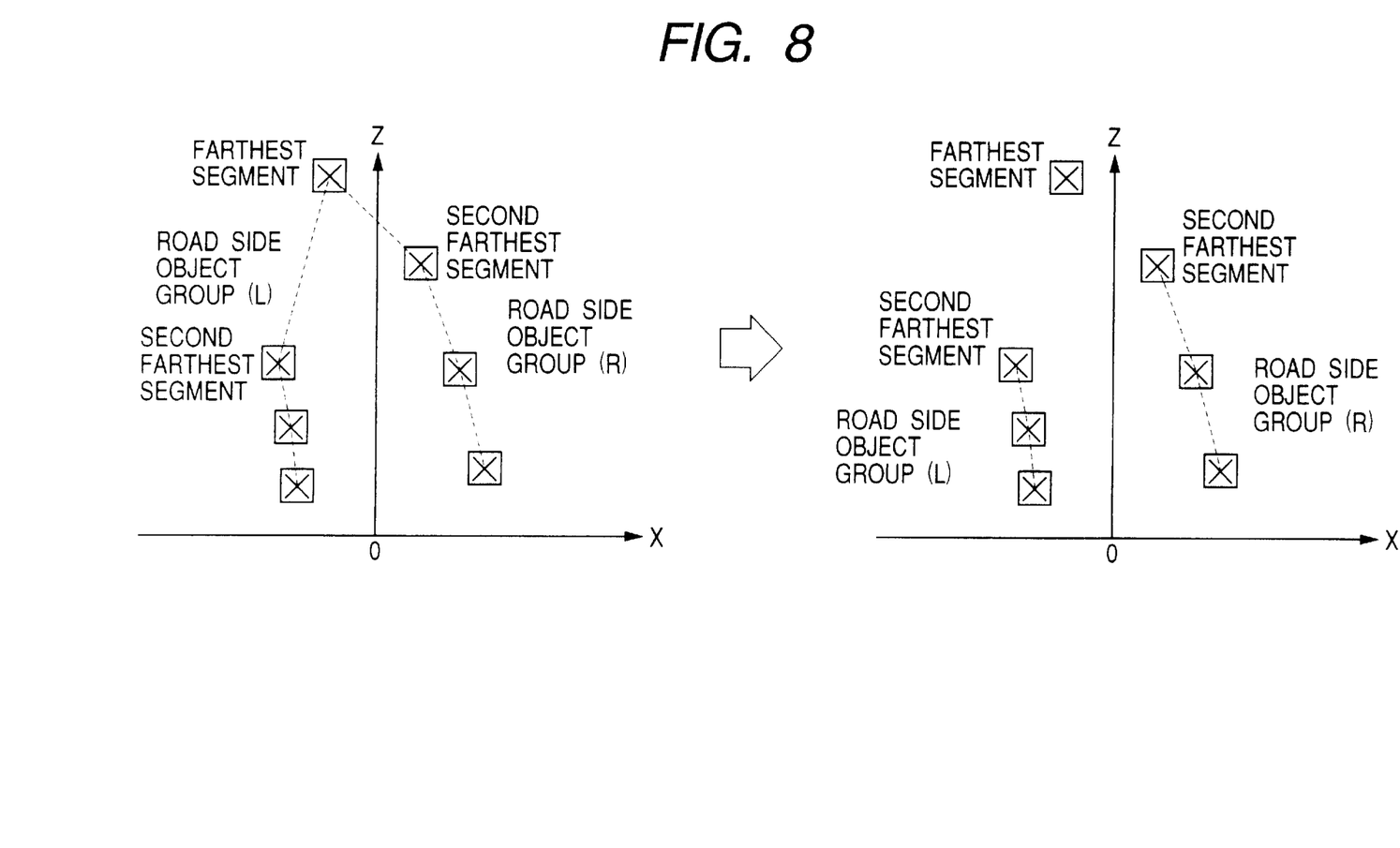
FIG. 8 is a diagram of an example of first road-side-object groups (L) and (R) in which the farthest segments are the same, and second road-side-object groups (L) and (R) generated by removing the common farthest segment from the first road-side-object groups (L) and (R).

The step S7000 subsequent to the step S6100 examines the road-side-object groups (L) and (R) which have been processed by the steps S5100 and S6100. Specifically, the step S7000 determines whether or not the farthest segment in the road-side-object group (L) and the farthest segment in the road-side-object group (R) are the same. As shown in FIG. 8, when the farthest segments are the same, the step S7000 removes the farthest segments from the road-side-object groups (L) and (R). On the other hand, when the farthest segments are not the same, the step S7000 keeps the farthest segments in the road-side-object groups (L) and (R).

Figure 9:
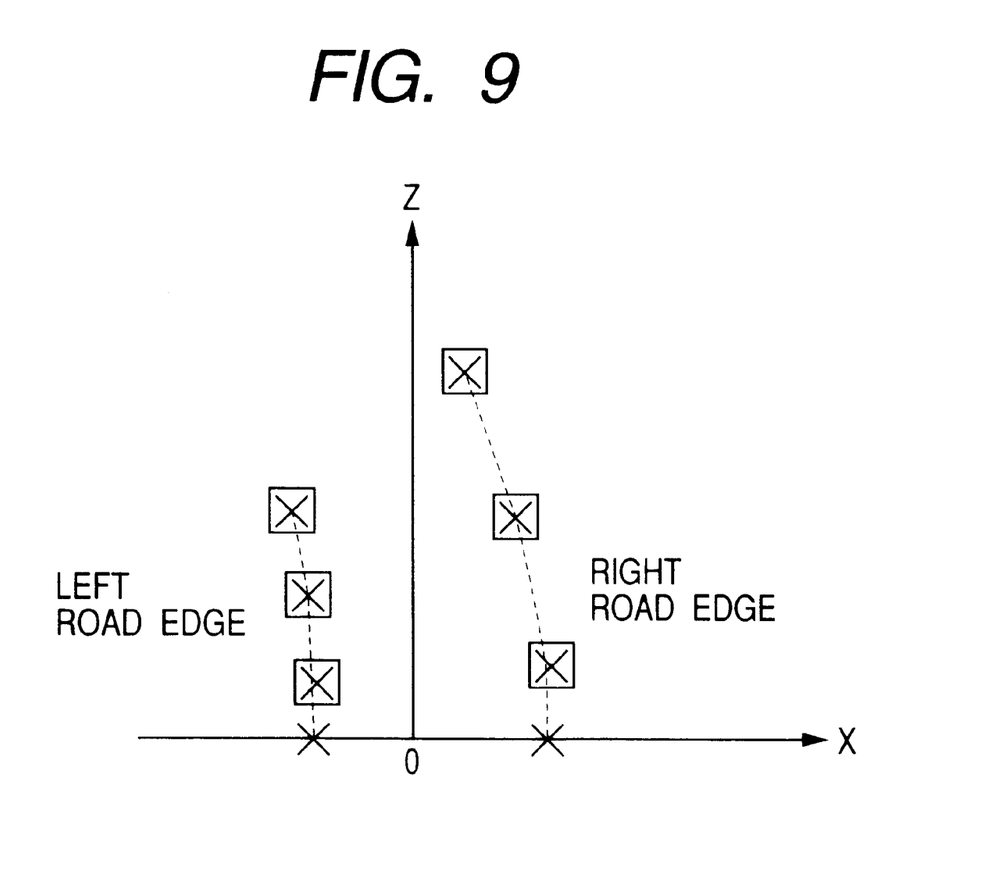
FIG. 9 is a diagram of an example of road-side-object groups (L) and (R) corresponding to left-hand and right-hand road edges, respectively.

The step S8000 following the step S7000 recognizes the left-hand road edge on the basis of the road-side-object group (L) which has been processed by the step S7000. In addition, the step S8000 recognizes the right-hand road edge on the basis of the road-side-object group (R) which has been processed by the step S7000. In more detail, as shown in FIG. 9, the step S8000 connects the segments in the road-side-object group (L) by lines through interpolation. The step S8000 recognizes the set of the connection lines as a first left-hand road edge. Similarly, the step S8000 connects the segments in the road-side-object group (R) by lines through interpolation. The step S8000 recognizes the set of the connection lines as a first right-hand road edge. Furthermore, the step S8000 calculates the point of intersection between the X axis and an extension of the first recognized left-hand road edge, and connects the intersection point and the nearest segment in the road-side-object group (L) by a line through interpolation. This line is added so as to extend the first recognized left-hand road edge into a second recognized left-hand road edge starting from the X axis, that is, starting from a position near the present vehicle. Also, the step S8000 calculates the point of intersection between the X axis and an extension of the first recognized right-hand road edge, and connects the intersection point and the nearest segment in the road-side-object group (R) by a line through interpolation. This line is added so as to extend the first recognized right-hand road edge into a second recognized right-hand road edge starting from the X axis, that is, starting from a position near the present vehicle. The step S8000 recognizes the shape of the road on the basis of the second recognized left-hand and right-hand road edges. After the step S8000, the current execution cycle of the program portion ends.

In the embodiment of this invention, the distance and angle measurement device 5 corresponds to radar means while the data grouping block 41, the object recognition block 43, and the road shape recognition block 45 provided by the computer 3 correspond to recognizing means. In addition, the data grouping block 41 and the object recognition block 43 correspond to object recognizing means. The road shape recognition block 45 corresponds to effective data extracting means, road-side-object group data generating means, and road edge recognizing means.

The embodiment of this invention has advantages as follows. Object-unit data pieces (Segments) effective for road shape recognition are selected from among all the object-unit data pieces. The effective object-unit data pieces are examined sequentially in the clockwise direction and the counterclockwise direction, and are grouped according to the condition that the distance to the object monotonically increases, and the condition that the distance between the neighboring objects is equal to or less than the adjacent-state-corresponding value. The grouping generates the road-side-object groups (L) and (R). The left-hand and right-hand road edges are recognized on the basis of the road-side-object groups (L) and (R), respectively. Actual objects (delineators) on the right-hand and left-hand road sides are sequentially arranged. Accordingly, regardless of whether the road is straight or curved, the road-side-object group (L) generated by grouping the detected objects sequentially in the clockwise direction accurately reflects the actual left-hand road edge. Similarly, the road-side-object group (R) accurately reflects the actual right-hand road edge. Therefore, it is possible to suitably recognize the road shape and to discriminate the right-hand and left-hand road edges from each other even in the case where a time-domain variation in the position of an effective road-side object (a delineator) is unknown.

Only a road-side-object group (L) having at least three members (segments) is used in the recognition of the left-hand road edge. Similarly, only a road-side-object group (R) having at least three members (segments) is used in the recognition of the right-hand road edge. Therefore, it is possible to accurately recognize the left-hand and right-hand road edges. Since each of the recognized left-hand and right-hand road edges is represented by the interpolation-based lines connecting the related segments, it is easy to execute a determination as to whether a preceding vehicle is present or absent on the basis of the recognized left-hand and right-hand road edges.

The step S5100 removes a wrong segment from the road-side-object group (L), so that the accuracy of the recognition of the left-hand road edge is increased. Similarly, the step S6100 removes a wrong segment from the road-side-object group (R), so that the accuracy of the recognition of the right-hand road edge is increased.

The step S7000 determines whether or not the farthest segment in the road-side-object group (L) and the farthest segment in the road-side-object group (R) are the same. When the farthest segments are the same, the step S7000 removes the farthest segment from the road-side-object groups (L) and (R). Accordingly, it is possible to further increase the accuracy of the recognition of the left-hand and right-hand road edges.

The embodiment of this invention may be modified as follows. (1) In the case where the step S7000 determines that the farthest segment in the road-side-object group (L) and the farthest segment in the road-side-object group (R) are the same, the step S7000 may remove the farthest segment from only one of the road-side-object groups (L) and (R). Thus, in this case, the step S7000 keeps the farthest segment in only one of the road-side-object groups (L) and (R), and the farthest segment is used in the road edge recognition. Specifically, the step S7000 decides which of the road-side-object groups (L) and (R) has a higher possibility of actually containing the farthest segment. The step S7000 keeps the farthest segment in only one of the road-side-object groups (L) and (R) which has a higher possibility of actually containing the farthest segment. In more detail, the step S7000 calculates a circle which passes through the nearest and second farthest segments in the road-side-object group (L), and which intersects with the X axis at a right angle. Then, the step S7000 calculates the X-axis-direction distance $\Delta X$ (L) between the circle and the farthest segment in the road-side-object group (L). Also, the step S7000 calculates a circle which passes through the nearest and second farthest segments in the road-side-object group (R), and which intersects with the X axis at a right angle. Then, the step S7000 calculates the X-axis-direction distance $\Delta X$ (R) between the circle and the farthest segment in the road-side-object group (R). The step S7000 compares the calculated X-axis-direction distances $\Delta X$ (L) and $\Delta X$ (R) with each other. The step S7000 keeps the farthest segment in only one of the road-side-object groups (L) and (R) which corresponds to the smaller X-axis-direction distance. It should be noted that a dead zone may be provided between the circles concerning the road-side-object groups (L) and (R).

(2) The step S5100 may unconditionally remove the farthest segment from the road-side-object group (L). Also, the step S6100 may unconditionally remove the farthest segment from the road-side-object group (R). In this case, the farthest segments are prevented from adversely affecting the road edge recognition.

(3) The segments in each of the road-side-object groups (L) and (R) may be connected by interpolation-based curves. In this case, the sets of curves are recognized as the left-hand and right-hand road edges.

(4) In the embodiment of this invention, the distance and angle measurement device 5 which employs the laser beam is used as radar means. The distance and angle measurement device 5 may be modified to use a millimeter wave beam. In the case where the radar means uses a Doppler radar or an FMCW radar employing a millimeter wave beam, information of a distance to a preceding vehicle and information of a relative speed of the preceding vehicle are simultaneously derived from an echo wave beam (a return wave beam). Thus, in this case, it is unnecessary to execute a step of calculating a relative speed from distance information.

What is claimed is:

1. An apparatus for recognizing a road shape, comprising:

radar means for applying a transmission wave to a predetermining angular range in a width-wise direction of a vehicle and for detecting each object based upon a reflected wave which results from reflection of the transmission wave; and recognizing means for recognizing a shape of a road extending ahead of the vehicle based upon a result of detection by the radar means;

wherein the recognizing means comprises:
1) object-unit data generating means for generating object-unit data pieces containing at least data pieces representing distances to objects in correspondence with vehicle-width-wise direction angles based upon the result of the detection by the radar means;
2) object recognizing means for determining whether each object is moving or stationary based upon a speed of the vehicle and a relative speed of the object which is derived from the reflected wave;
3) effective data extracting means for extracting objects from the object-unit data pieces which are effective for road shape recognition based upon a result of the determination by the object recognizing means;
4) road-side-object group data generating means for grouping objects of the extracted effective object-unit data pieces which represent monotonically increasing distances as viewed along a clockwise angle direction to generate data representative of a first road-side-object group, for grouping ones of the extracted effective object-unit data pieces which represent monotonically increasing distances as viewed along a counterclockwise angle direction to generate data representative of a second road-side-object group, for determining whether or not a farthest object in the first road-side-object group is on a same road side as other objects in the first road-side-object group based upon a positional relationship among the farthest object and the other objects, for keeping the farthest object in the first road-side-object group only when the farthest object is on the same road side as the other objects, for determining whether or not a farthest object in the second road-side-object group is on a same road side as other objects in the second road-side-object group based upon a positional relationship among the farthest object and the other objects, and for keeping the farthest object in the second road-side-object group only when the farthest object is on the same road side as the other objects; and 5) road edge recognizing means for recognizing a road edge based upon the data representative of the first and second road-side-object groups generated by the road-side-object group data generating means.

2. The apparatus of claim 1, wherein the road-side-object group data generating means is further for unconditionally removing a farthest object from the first and second road-side-object groups and using a resultant first and second road-side-object groups as a final first and second road-side-object groups.

3. The apparatus of claim 1, wherein the recognizing means comprises a computer.

4. An apparatus for recognizing a road shape, comprising:

radar means for applying a transmission wave to a predetermined angular range in a width-wise direction of a vehicle and for detecting each object based upon a reflected wave which results from reflection of the transmission wave; and recognizing means for recognizing a shape of a road extending ahead of the vehicle based upon a result of detection by the radar means;

wherein the recognizing means comprises:

1) object-unit data generating means for generating object-unit data pieces containing at least data pieces representing distances to objects in correspondence with vehicle-width-wise direction angles based upon the result of the detection by the radar means;

2) object recognizing means for determining whether each object is moving or stationary based upon a speed of the vehicle and a relative speed of the object which is derived from the reflected wave;

3) effective data extracting means for extracting objects from the object-unit data pieces which are effective for road shape recognition based upon a result of the determination by the object recognizing means;

4) road-side-object group data generating means for grouping objects of the extracted effective object-unit data pieces which represent monotonically increasing distances as viewed along a clockwise angle direction to generate data representative of a first road-side-object group, for grouping ones of the extracted effective object-unit data pieces which represent monotonically increasing distances as viewed along a counterclockwise angle direction to generate data representative of a second road-side-object group, for determining whether or not a farthest object in the first road-side-object group and a farthest object in the second road-side-object group are the same, for, when the farthest objects are the same, removing the farthest object from the first and second road-side-object groups and changing the first and second road-side-object groups into third and fourth road-side-object groups respectively, and for generating data representative of the third road-side-object group and data representative of the fourth road-side-object group; and 5) road edge recognizing means for recognizing a first road edge based upon the data representative of the third road-size-object group and for recognizing a second road edge based upon the data representative of the fourth road-side-object group.

5. An apparatus for recognizing a road shape, comprising:

radar means for applying a transmission wave to a predetermining angular range in a width-wise direction of a vehicle and for detecting each object based upon a reflected wave which results from reflection of the transmission wave; and recognizing means for recognizing a shape of a road extending ahead of the vehicle based upon a result of detection by the radar means;

wherein the recognizing means comprises:

1) object-unit data generating means for generating object-unit data pieces containing at least data pieces representing distances to objects in correspondence with vehicle-width-wise direction angles based upon the result of the detection by the radar means;

2) object recognizing means for determining whether each object is moving or stationary based upon a speed of the vehicle and a relative speed of the object which is derived from the reflected wave;

3) effective data extracting means for extracting objects from the object-unit data pieces which are effective for road shape recognition based upon a result of the determination by the object recognizing means;

4) road-side object group data generating means for grouping objects of the extracted effective object-unit data pieces which represent monotonically increasing distances as viewed along a clockwise angle direction to generate data representative of a first road-side-object group, for grouping ones of the extracted effective object-unit data pieces which represent monotonically increasing distances as viewed along a counterclockwise angle direction to generate data representative of a second road-side-object group, for determining whether or not a farthest object in the first road-side-object group and a farthest object in the second road-side-object group are the same, for, when the farthest object in the first and second road-side-object group is the same, determining which of the first and second road-side-object groups has a higher possibility of actually containing the farthest object based upon positional relationships among the farthest object and other objects in the first and second road-side-object groups, for keeping the farthest object in one of the first and second road-side-object groups which corresponds to the higher possibility and removing the farthest object from the other of the first and second road-side-object groups to generate a third and a fourth road-side-object groups from the first and second road-side-object groups respectively, and for generating data representative of the third road-side-object group and data representative of the fourth road-side-object group; and 5) road edge recognizing means for recognizing a first road edge based upon the data representative of the third road-side-object group and for recognizing a second road edge based upon the data representative of the fourth road-side-object group.

6. A method for recognizing a road shape, comprising:

applying a transmission wave to a predetermining angular range in a width-wise direction of a vehicle;

detecting each object based upon a reflected wave which results from reflection of the transmission wave; and recognizing a shape of a road extending ahead of the vehicle based upon the detecting of each object based upon a reflected wave which results from reflection of the transmission wave;

wherein the method of recognizing a shape of a road extending ahead of the vehicle based upon the detecting further comprises:

(1) generating object-unit data containing at least data representing distances to objects in correspondence with vehicle-width-wise direction angles based upon results of the detecting of each object based upon a reflected wave which results from reflection of the transmission wave;

(2) determining whether each object is moving or stationary based upon a speed of the vehicle and a relative speed of the object as derived from the reflected wave;

(3) extracting objects from the object-unit data which are effective for road shape recognition based upon results of the determining whether each object is moving or stationary based upon a speed of the vehicle and a relative speed of the object which is derived from the reflected wave;

(4) grouping objects of the extracted effective object-unit data which represent monotonically increasing distances as viewed along one of clockwise and counterclockwise angular directions to generate data representative of a road-side-object group;

(5) determining a farthest object in the data representative of the road-side-object group;

(6) determining if the road-side-object group actually contains the farthest object based upon a higher possibility of containing the farthest object on the basis of positional relationships among the farthest object and other objects in the road-side-object group; and (7) removing the farthest object from the road-side-object group if it is determined that the road-side-object group does not contain the farthest object based upon the higher possibility of positional relationships among the farthest object and other objects in the road-side-object group.

* * * * *